United States Patent
Hussain

(10) Patent No.: US 8,037,324 B2
(45) Date of Patent: Oct. 11, 2011

(54) POWER OVER ETHERNET CONNECTOR WITH INTEGRATED POWER SOURCE EQUIPMENT (PSE) CONTROLLER SUPPORTING HIGH POWER APPLICATIONS

(75) Inventor: Asif Hussain, Arleta, CA (US)

(73) Assignee: Broadcom Corporation, Irvine, CA (US)

( * ) Notice: Subject to any disclaimer, the term of this patent is extended or adjusted under 35 U.S.C. 154(b) by 608 days.

(21) Appl. No.: 12/052,458

(22) Filed: Mar. 20, 2008

(65) Prior Publication Data
US 2008/0235523 A1 Sep. 25, 2008

Related U.S. Application Data

(60) Provisional application No. 60/918,914, filed on Mar. 20, 2007.

(51) Int. Cl.
G06F 1/26 (2006.01)
(52) U.S. Cl. ...................................................... 713/300
(58) Field of Classification Search .......... 713/300–340; 363/63; 370/252, 352, 419; 379/413, 399.01; 439/517
See application file for complete search history.

(56) References Cited

U.S. PATENT DOCUMENTS

| | | | | |
|---|---|---|---|---|
| 7,469,348 B2 * | 12/2008 | Camagna et al. | ............. | 713/300 |
| 7,504,744 B2 * | 3/2009 | Stanford | ........................ | 307/29 |
| 7,685,452 B2 * | 3/2010 | Camagna et al. | ............. | 713/340 |
| 7,706,392 B2 * | 4/2010 | Ghoshal et al. | ............... | 370/419 |
| 7,711,967 B2 * | 5/2010 | Woo et al. | ...................... | 713/300 |
| 7,761,719 B2 * | 7/2010 | Ghoshal et al. | ............... | 713/300 |
| 7,797,558 B2 * | 9/2010 | Ghoshal | ......................... | 713/310 |
| 2007/0133238 A1 * | 6/2007 | Herbold | .......................... | 363/63 |

* cited by examiner

Primary Examiner — Raymond Phan
(74) Attorney, Agent, or Firm — Sterne, Kessler, Golstein & Fox P.L.L.C.

(57) ABSTRACT

In a Power over Ethernet (POE) system, a power source equipment (PSE) device configured to deliver power to one or more powered devices (PDs) over a plurality of Ethernet transmission lines. The PSE interface includes a multi-port transmission line connector capable connecting to multiple Ethernet transmission lines, and a power source equipment (PSE) controller module integrated with the multi-port transmission line connector. The PSE controller module is capable of high power operation beyond that specifically by IEEE standard 802.3af™ for powered devices. More specifically, the PSE controller is configured to deliver over 15.4 Watts, and up to 36 Watts of power, to meet the needs of high powered devices such as IP Phones, and access points. Further, the PSE controllers can utilize, currently unused, class 4 of IEEE standard 802.3af™ to identify, initiate, and classify the high power operation. Or it could use multiple event physical layer classification and Data Link Layer Classification for this high power PD detection as described in the latest draft from 'at' task force from IEEE.

15 Claims, 12 Drawing Sheets

POWER OVER ETHERNET CONNECTOR WITH INTEGRATED POWER SOURCE EQUIPMENT (PSE) CONTROLLER SUPPORTING HIGH POWER APPLICATIONS

CROSS REFERENCED TO RELATED APPLICATIONS

This application claims the benefit of U.S. Provisional Application No. 60/918,914, filed on Mar. 20, 2007, which is incorporated by reference herein in its entirety.

BACKGROUND OF THE INVENTION

1. Field of the Invention

The present invention generally relates to Power Over Ethernet, and specifically to Power Source Equipment connectors with integrated controllers that are capable of supporting high power mode.

2. Background Art

Ethernet communications provide high speed communications between data terminals. For example, a switch may be one data terminal and an IP Phone may be another data terminal. Power over Ethernet configurations provide power over the same transmission lines (e.g. twisted pair, cable, etc) that carry the data. The power is generated at the Power Source Equipment (PSE) side of the transmission line and is carried over the data transmission lines to a Powered Device (PD). For example, a switch (PSE) may connect power to an IP phone (PD) that has been activated.

A PSE controller is typically used for power management of the connected Powered Device. For example, a PSE controller typically detects whether a valid PD device is active, and manages and classifies the power flow to the PD.

The PSE controller is typically separate from both the magnetics and from the connector. For example, often a RJ45 connector can be used to connect the PSE to the data transmission lines. The connector can often include the magnetics required to separate the data from power on the PSE side.

What is needed is a PSE connector configuration that leverages integration in the PSE connector, including a semi-automatic and stand alone solutions.

Further, current PSE controllers are configured to service the power requirements of PDs as defined by IEEE 802.3af™, which is limited to approximately 15.4 watts of power to the PD. However, some newer PDs require substantially more power (e.g. high power applications), including newer IP phones, access points, and video cameras. What is further needed is a PSE connector that is configured to support higher power applications, than that enabled by IEEE 802.3af™.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
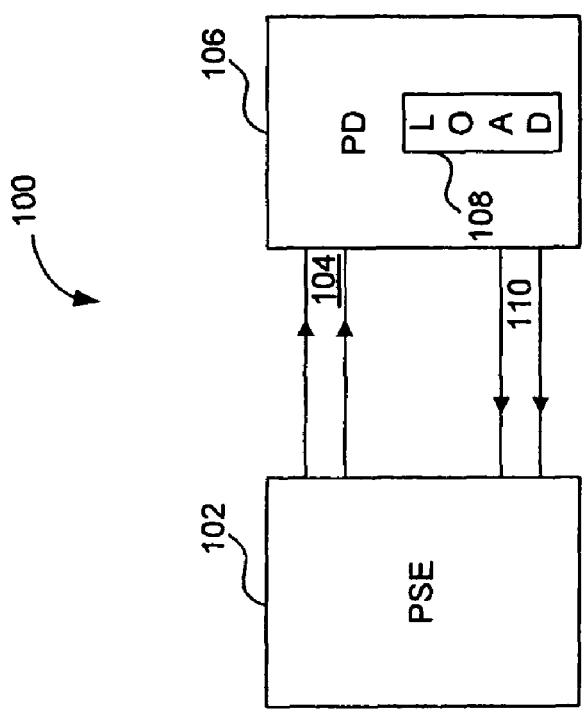
FIG. 1 provides an overview of a Power over Ethernet system.

FIG. 1 illustrates a high level diagram of a conventional Power over Ethernet (PoE) system 100 that provides DC power over a common data communications medium. Referring to FIG. 1, power source equipment 102 provides DC power over conductors 104, 110 to a powered device (PD) 106 having a representative electrical load 108. Accordingly, the power transfer between the PSE 102 and the PD 106 occurs simultaneously with the exchange of high speed data over the conductors 104, 110. In one example, the PSE 102 when used with a switching and PHY chip is a data switch having multiple ports that is communicating with one or more PD devices, such as Internet phones, wireless access points, etc.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 1 Gigabit Ethernet. In 10/100 Ethernet, only two of the four pairs carry data communications, and the other two pairs of conductors are unused. Herein, conductor pairs may be referred to as Ethernet cables or communication links or structured cabling for ease of discussion. The conductor pairs may be CAT-5 cable for example.

Figure 2:
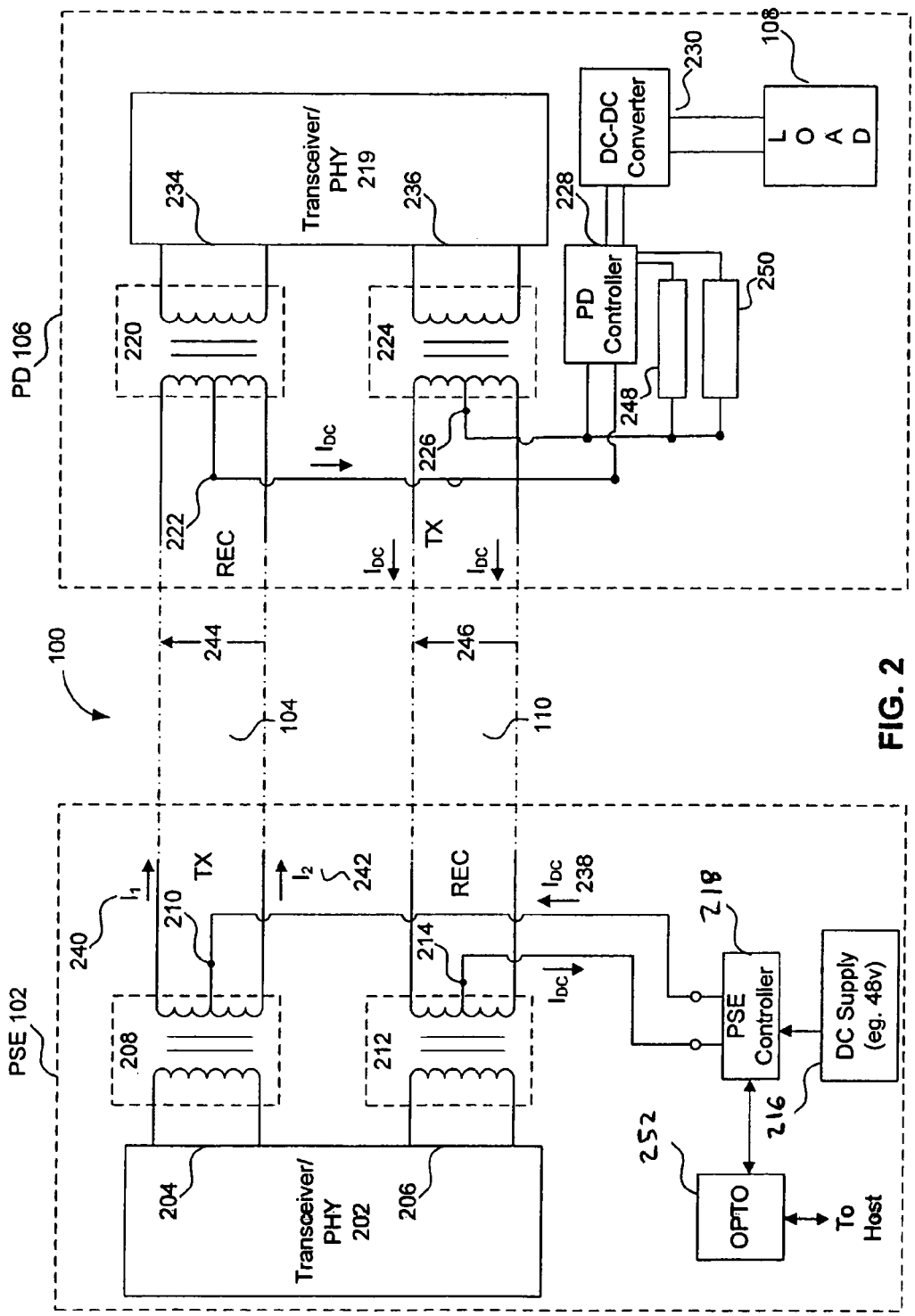
FIG. 2 provides a more detailed view of a Power over Ethernet system including DC power transfer from a PSE device to a PD device.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs.) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC output voltage is applied across the respective center taps (e.g. 210, 214) of the transformers 208 and 210 on the conductor side of the transformers. An example DC output voltage for the DC supply 216 is 48 volts, but other voltages could be used depending on the voltage/power requirements of the PD 106.

The PSE 102 further includes a PSE controller 218 which performs the power management functions based on the dynamic needs of the PD 106. More specifically, the PSE controller 218 measures the voltage, current, and temperature, etc so as to characterize the power requirements of the PD 106. The PSE Controller 218 communicates through an opto-coupler 252 with a host processor/controller (not shown) in order to implement and communicate management functions. The opto-coupler 252 also provides isolation from the high voltage of the "wire-side" of the PoE configuration and therefore opto-coupler 252 may also be referred to as an opto-isolator.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. The IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 side includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (e.g. 3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements. FIG. 2 also illustrates a signature resistor 248 and a classification resistor 250 connected to PD 102. Signature resistor 248 is used to validate the PD 106, and the classification resistor 250 is used for classifying PD 106 and to limit current for classification.

During ideal operation, a direct current (IDC) 238 flows from the PSE Controller 216 through the first center tap 210, and divides into a first current (I1) 240 and a second current (I2) 242 that is carried over conductor pair 104. The first current (I1) 240 and the second current (I2) 242 then recombine at the third center tap 222 to reform the direct current (IDC) 238 so as to power PD 106. On return, the direct current (IDC) 238 flows from PD 106 through the fourth center tap 226, and divides for transport over conductor pair 110. The return DC current recombines at the second center tap 214, and returns to the DC power supply 216.

As discussed above, data transmission between the PSE 102 and the PD 106 occurs simultaneously with the power as described above. Accordingly, a first communication signal 244 and/or a second communication signal 246 are simultaneously differentially carried via the conductor pairs 104 and 110 between the transceivers or PHY of PSE 102 and the PD 106. It is important to note that the communication signals 244 and 246 are differential signals that ideally are not effected by the DC power transfer described above. However, the signaling used by the PSE controller is common mode signals so it does not interact with data transmission.

In order to conduct its management and control of PD 106, PSE 102 analyzes certain characteristics of PD 106, and the system as a whole, based on measurements taken at PD 106. Based on those characteristics, PSE 102 can determine certain attributes of PD 106 as well as attributes of the system. Example attributes determined by PSE 102 can include, but are not limited to, the following: valid device detection, power classification, AC disconnect information, short circuit detection, PD load variations, various current measurements, overload conditions, and inrush conditions.

Figure 3:
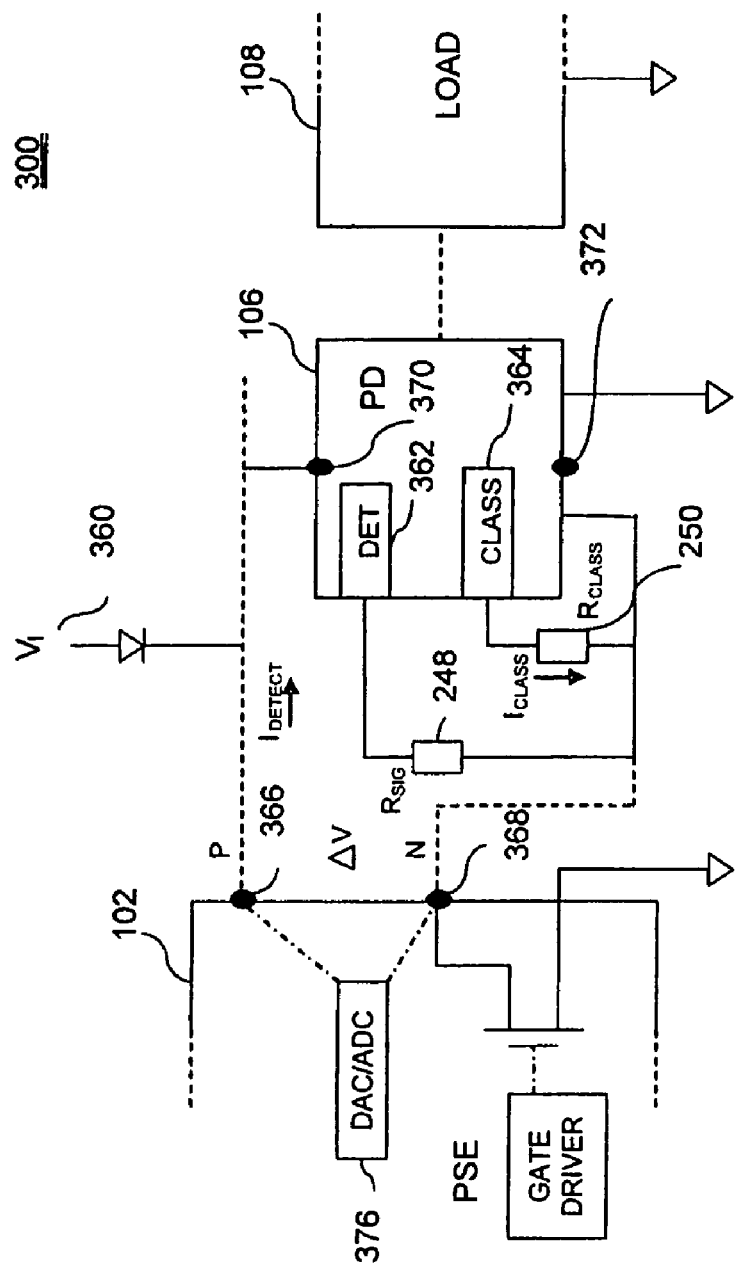
FIG. 3 illustrates detection and classification in a PD device.

FIG. 3 illustrates detection and classification the of the PD 106.

As shown in FIG. 3, positive terminal 366 of PSE 102 is connected to a first terminal 370 of PD 106, and negative terminal 368 of PSE 102 is connected to a second terminal 372 of PD 106. (For the sake of simplicity, bridge rectifiers and series diodes are not illustrated and internal hot swap FET inside the PD is not shown) A voltage source 360 is connected to the positive terminal 366 of PSE 102 to provide input voltage V1. According to the current IEEE 802.3af™ standard, the operating voltage should range from 44V to 57V.

Still referring to FIG. 3, PD 106 includes detection circuitry 362 and classification circuitry 364. The signature resistance 248 is located between detection circuitry 362 and the negative terminal 368 of PSE 102. Signature resistance 248 is used to determine the validity of PD 106, as will be described in more detail below. The classification resistor 250 is located between classification circuitry 364 and the negative terminal 368 of PSE 104. Current ($I_{CLASS}$) across the classification resistor 352 determines the power classification signature for PD 106, as will also be discussed in more detail below.

Before power is supplied to PD 106, PSE 102 first determines whether PD 106 is a valid device. This is called 'detection.' For detection, PSE 102 may probe PD 106 with the current ($I_{DETECT}$). In addition, PSE 102 may probe for the voltage drop ($\Delta V$) between positive terminal 366 and negative terminal 368. This can be done using an internal analog-to-digital converter 376, for example. Alternatively, a bandgap voltage (e.g., in the range 2.7V to 10.1V) (not shown) can be applied at PD 106. The resistive signature $R_{SIG}$ 248 is then calculated according to $R_{SIG} = \Delta V / I_{DETECT}$. If $R_{SIG}$ is calculated to be an expected value (e.g., approximately 25K ohms, or within a specified resistance value range), then PD 106 is determined to have a valid signature and is deemed a compatible valid device. If PD 106 is deemed a non-compatible device, then power will not be supplied to PD 106. IEEE 802.3af™ requires minimum of two points detection to ensure the validity of the device.

After detection of a valid PD, power classification occurs. Power classification is used to determine the range of minimum power needed at the output of PSE 102 and, in turn, the range of maximum power to be used by PD 106, according to IEEE 802.3af™. For power classification, PSE 102 applies a voltage at PD 106. For voltage applied to PD 106 ranging from 14.5V to 20.5V, IEEE 802.3af™ currently defines four classifications (classes 0-3) of power ranges, with a fifth classification (class 4) reserved for future use (but currently treated as class 0). In order to classify the PD to the appropriate power range, the current is measured through classification resistor 250.

In IEEE 802.3af™, classes 0-3 are currently limited to providing a maximum of 15.4 Watts, 350 mA per port to PDs. However, higher power PD applications are now available that require more than (15.4 Watts, 350 mA) per port. Some of the high power PD applications include: IP phones, access points, video cameras, etc. As noted above, class 4 in IEEE 802.3af™ is open for future use. Accordingly, class 4 can be used for the classification of high power configurations that are above and beyond the 15.4 Watts standard that is specified by IEEE 802.3af™. These high power applications can include a POE solution that provides greater than 15.4 Watt (can be up to 720 mA) according to the present invention. For example, an integrated PSE connector having an integrated PSE controller, described herein, can provide up to 36 Watts (at Vport=50v) of power under new class 4 operation. In one embodiment, multiple physical layer classifications and data link layer classifications could also be used in this high power PD detection. High power support inside the integrated magnetic PoE RJ45 connector may cause addition power dissipation and therefore a heat sink along with the air flow may be required to be implemented in the PoE RJ45 connector. In addition to this and depending upon the integrated magnetic PoE RJ45 connector, it may be required for the PSE controller chip to have thermal pad on top.

An integrated PoE Magnetic RJ45 connector will now be described that integrates magnetics and a POE PSE controller into a single connector. The connector can be an RJ45 connector, which is easily connectable to standard Ethernet cables. Alternatively, other types of connectors can be used. Conventional integrated POE/PSE connector solutions only offer either manual mode, or fully automatic mode, which are described further below. No one offers a semi-automatic mode inside an integrated POE Magnetic RJ45 solution, the advantages of which will be discuss below.

Figure 4A:
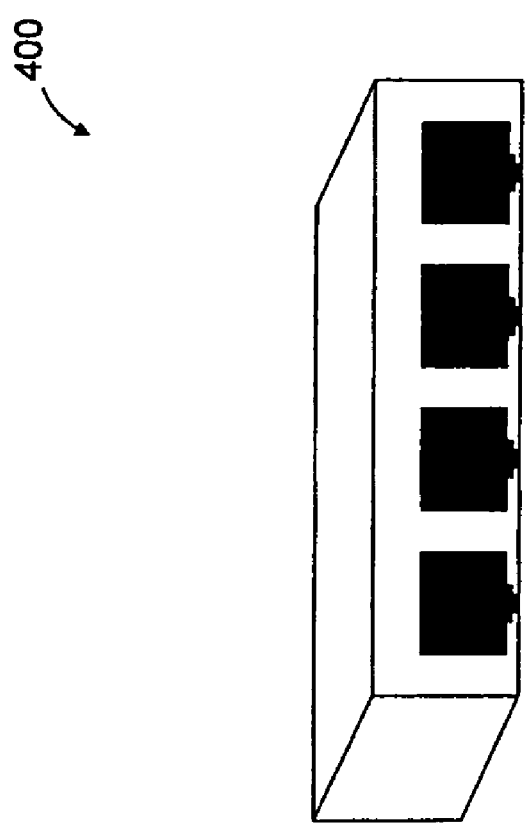
FIGS. 4A-4B illustrates a RJ45 connector having an integrated PSE controller for POE power management.

FIG. 4A illustrates an integrated PSE connector 400 that is an integrated POE magnetic RJ45 Solution having a RJ45 gang connector (2×4, 2×6, 2×8, etc.) with integrated magnetics and integrated PSE Controller(s). In other words, the PSE controller(s) are integrated within the RJ45 connector portion of the PSE connector 400.

Figure 4B:
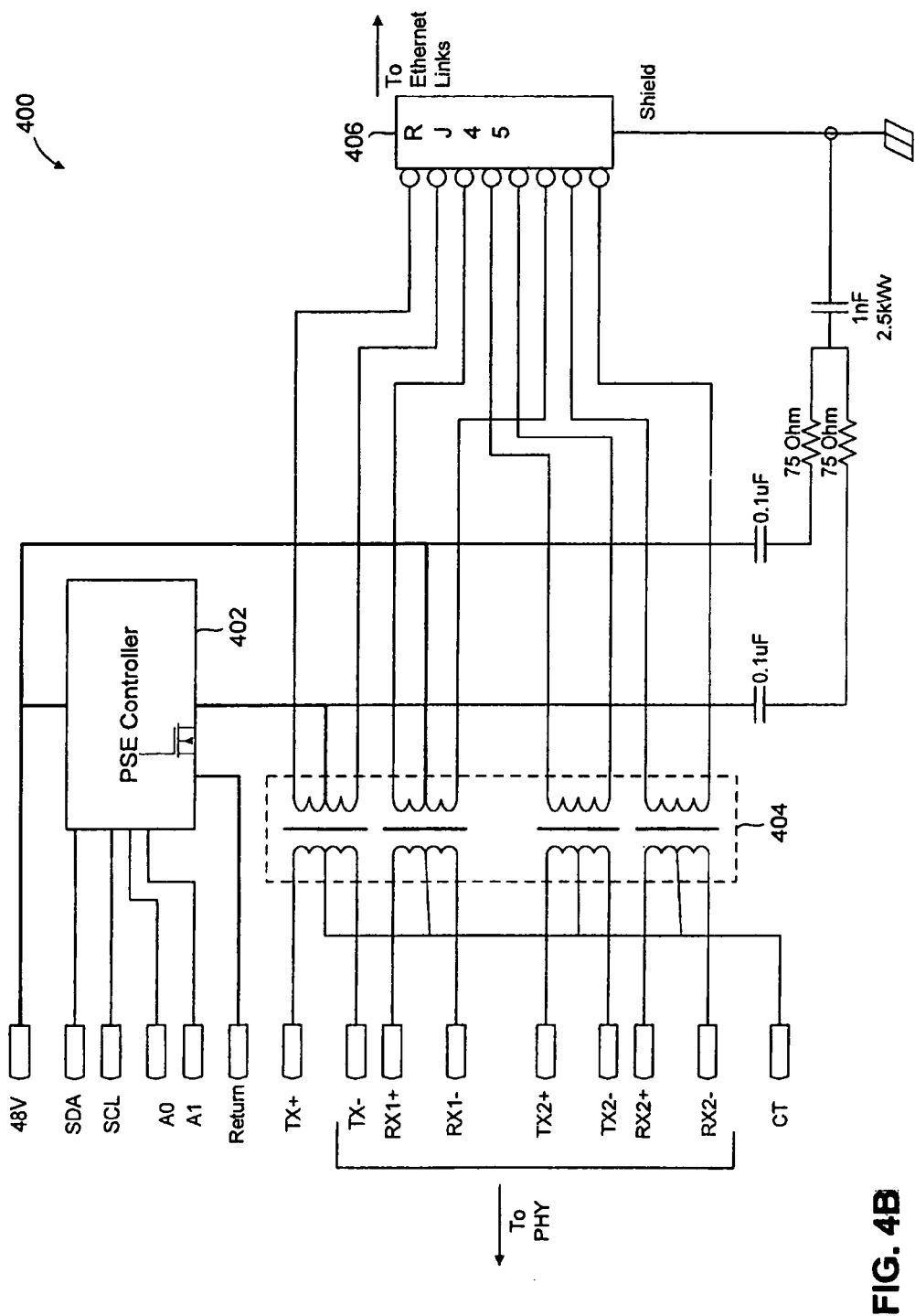

FIG. 4B illustrates the schematic of the integrated PoE magnetic RJ45 connector with the integrated PSE controller. Referring to FIGS. 4A and 4B, the integrated PSE connector 400 couples PHY transceivers with the Ethernet transmission lines. Specifically, the integrated PSE Controller 400 connects the PHY transceivers (e.g. transceiver 202) to the corresponding Ethernet cables, through integrated magnetics 404 and a connector 406, for example an RJ45 connector 406. Further, PSE connector 400 includes integrated PSE Controller(s) 402 to control the power distribution and management to the PD(s). For the sake of simplicity, internal 3.3v switching regulator, opto-couplers, etc. are not shown in FIG. 4B but are understood by those skilled in the art.

Figure 5:
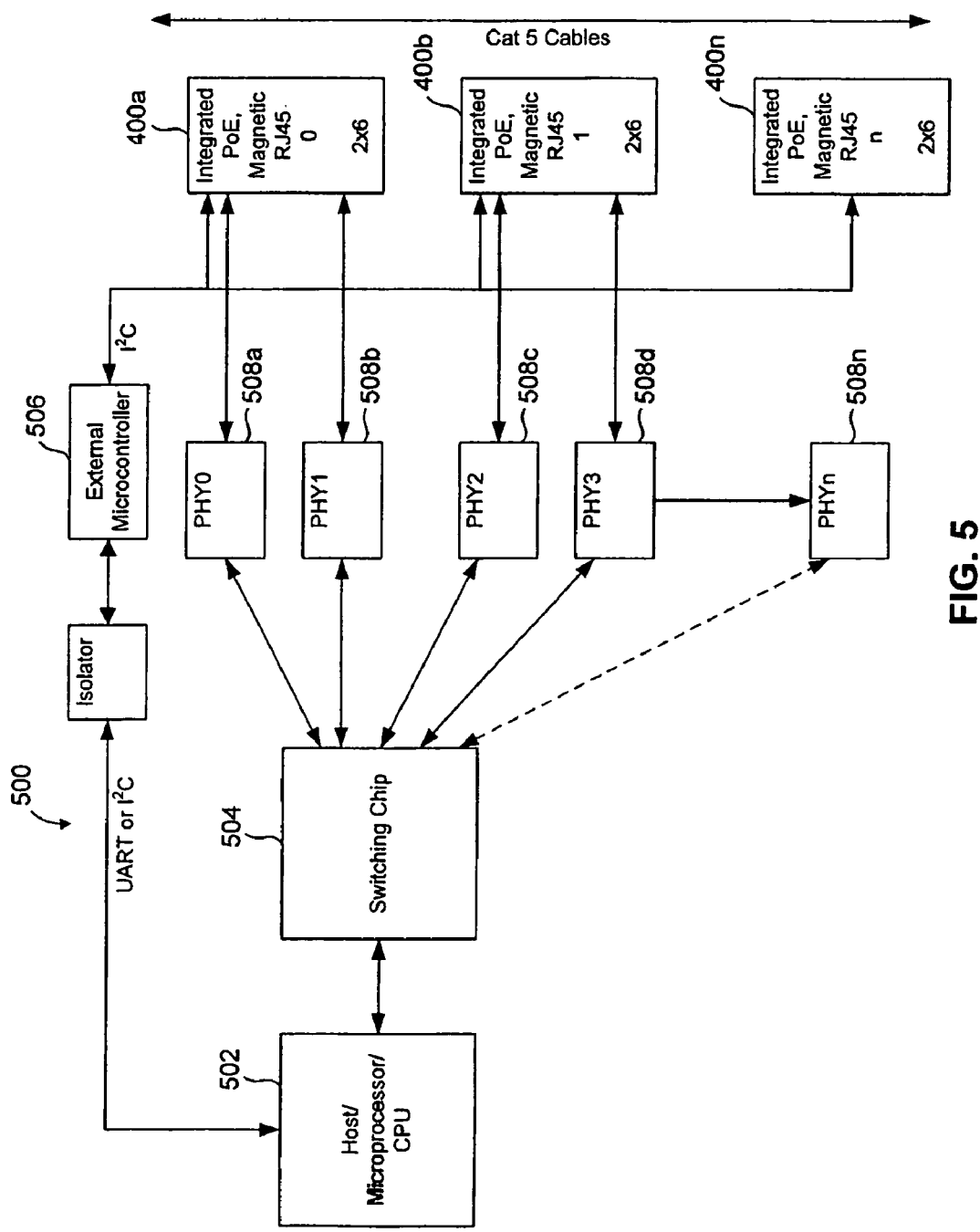
FIG. 5 illustrates a typical POE system using conventional integrated Magnetic RJ45 connectors with an external micro-controller for power management.

FIG. 5 illustrates a typical PSE device 500 using conventional integrated magnetic PSE connectors 400 with an external micro-controller. The system includes a Host controller/CPU 502, switching chip 504, external microcontroller 506, PHYs 508a-n that are connected to corresponding PSE connectors 400a-n. Each of the PSE connector 400a-n have integrated PSE controllers 402. The external micro-controller 506 is used to implement the semi-Auto mode. However, this external micro-controller 506 is not required for manual or Auto mode. The external micro-controller 506 communicates and controls each of the PSE controller 402a-n, directly. This requires increased connections, PCB routing and external resources that are undesirable. Further, the external microcontroller 506 takes up board space and may not be a feasible solution in complicated PCB layouts. This conventional configuration of integrated PoE, magnetic RJ45 Connector does not support semi-automatic mode, where the individual integrated PSEs control the power management. In other words, the integrated PSEs are under the control of the external microcontroller which is doing all the management. In one embodiment, the opto-coupler 252 can be integrated within the magnetic jack RJ45 connectors 400, so as to provide the proper communication and isolation between the PSE controllers inside the magnetic jacks RJ45 and the host processor/CPU 502.

Figure 6:
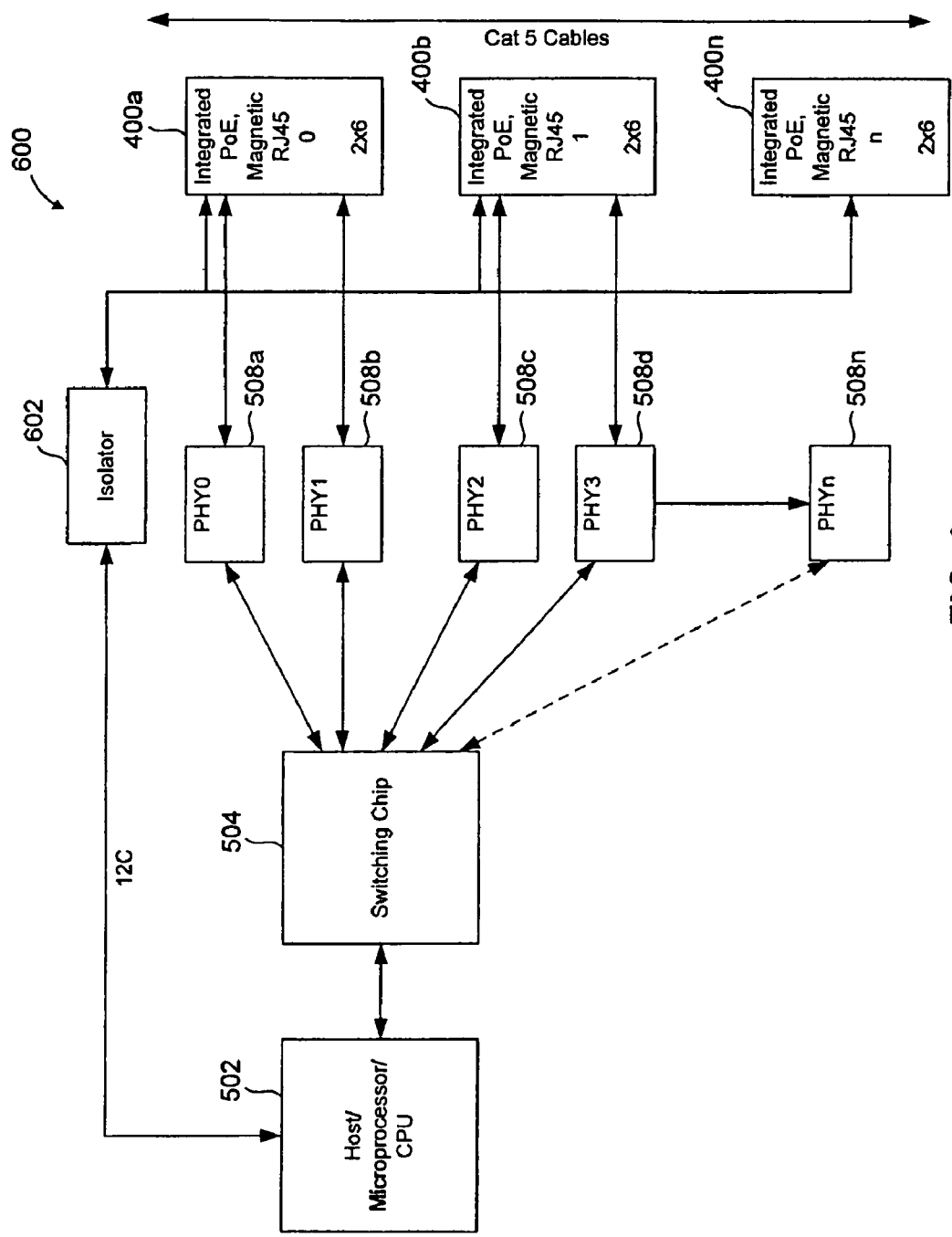
FIG. 6 illustrates a typical POE system using conventional integrated magnetic RJ45 connectors without an external micro-controller using the CPU for power management.

FIG. 6 illustrates a typical POE system 600 using conventional integrated PSE connectors 400 without an external micro-controller. Instead, the CPU 502 directly controls the integrated PSE connector 402 through an opto isolator 602. However, using the CPU 502 for this purpose will require significant processing power from the CPU 502 to implement the power management, since there is no micro-controller inside the integrated magnetic RJ45 connector, that processing power could be used elsewhere, and therefore is undesired. In other words, it is preferable not to burden the CPU 502 with this POE management functions. In one embodiment, the opto-coupler 602 can be integrated within the magnetic jack RJ45 connectors 400, so as to provide the proper communication and isolation between the PSE controllers inside the magnetic jacks RJ45 and the host processor/CPU 502.

Figure 7:
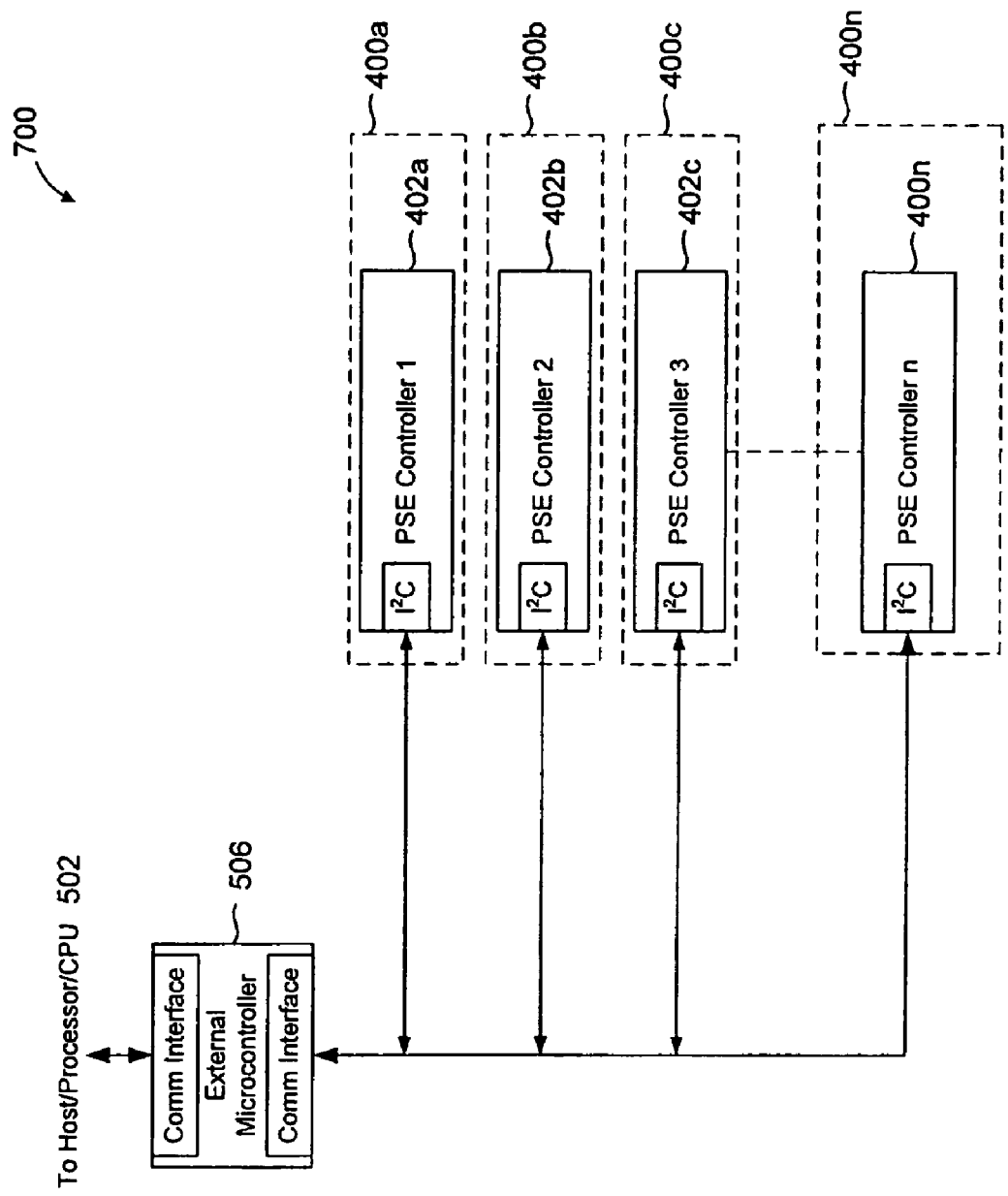
FIG. 7 illustrates a POE system architecture inside integrated magnetic RJ45 connectors and integrated PSE controllers in semi-automatic mode.

FIG. 7 illustrates a POE system 700 with integrated PSE connectors 400 having integrated PSE controllers 402a-n that are controlled by a external microcontroller 702 in semi-automatic mode. In the semi-automatic mode, all of the PSE controller chips 402a-n are coupled to the external microcontroller 506. The purpose of this configuration is to take the load off the host controller 502 using the external microcontroller 506 to do the power management functions. The host processor 502 is then only used to pool the status from the external microcontroller 506, and keep track of the status for reporting purposes. In other words, the host processor/cpu 502 may be used to report the status the power management of the Ethernet devices. The POE system 700 is essentially the POE system 500 with the PHYs not shown to simply the illustration of the control functions. As discussed above, the microcontroller 506 communicates directly with the PSE controller chip 402 in each integrated connector 400. The communication can be via $I^2C$ interface, or another type of interface. Further, the communication to the Host Processor/CPU 502 can be via $I^2C$ interface, or another type of interface.

Figure 8A:
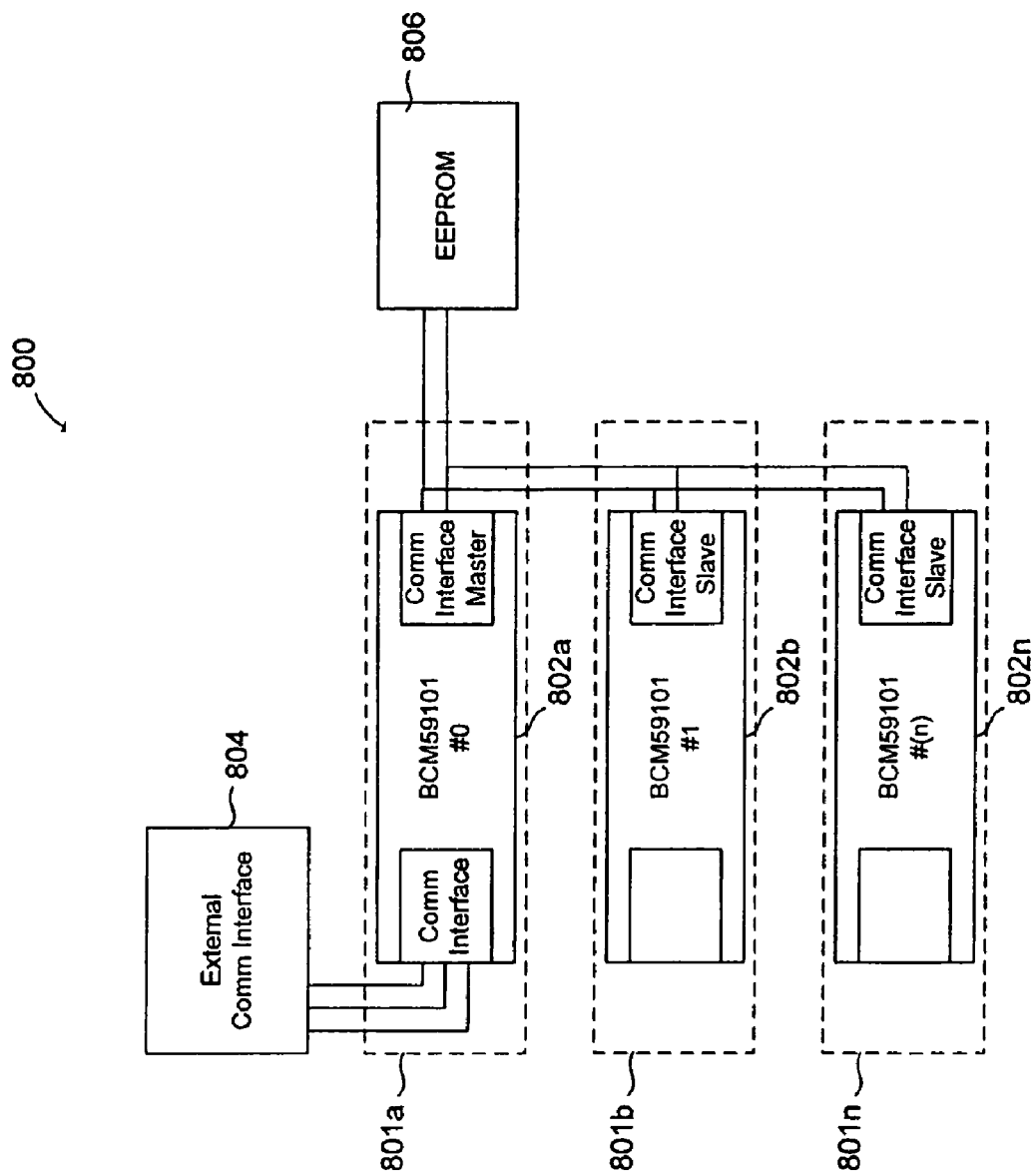
FIGS. 8A-8B illustrate a semi-automatic mode solution having an internal master controller.

FIG. 8A illustrates a semi-automatic mode solution 800 according to embodiments of the present invention, having an external communications interface 804, and PSE connectors 801a-n with integrated PSE controllers 802a-n. Each PSE connector 801 also includes also integrated RJ45 connectors with integrated magnetics, similar to the PSE connector 400, in addition to the PSE controllers 802a-n. As with FIG. 7, the PHYs, magnetics, and actual physical connectors are not shown for ease of discussion. In other words, the integrated magnetics can be similar to magnetics 208, 212, 220, and 224. In one embodiment, the opto-coupler 602 can be integrated within the magnetic jack RJ45 connectors 400, so as to provide the proper communication and isolation between the PSE controllers inside the magnetic jacks RJ45 and the host processor/CPU 502.

The PSE controller 802a operates as a master controller that controls the slave controllers 802b-n, and collectively can be referred to as a PSE controller module for convenience. During operation, the PSE controllers 802*a-n* determine the validity of the corresponding PD connection, and classify the power requirements of the PD once validity has been established. The PSEs 802 then control and monitor the power distribution to the PD. In other words, once a PSE controller 802 determines that a valid PD has been connected, then the PSE 802 controls the power distribution and disconnects the power when the PD disconnects. The external interface 804 only provides a status of the PSE 802*a-n* power control. For example, the status can include that the link to the PD is up and running and that power is being transferred to the PD. The status can be provided to a host processor/CPU 502 for further reporting, etc. The communications can be via multiple types of communications standards including I²C, serial, etc, and other interfaces known to those skilled in the arts.

As shown, the master controller 802 and the slave controllers are 802*b-n* are connected together so that the master communicates with the slave controllers via the most adjacent slave controller. Other configurations could be used including parallel control and communications.

Figure 8B:
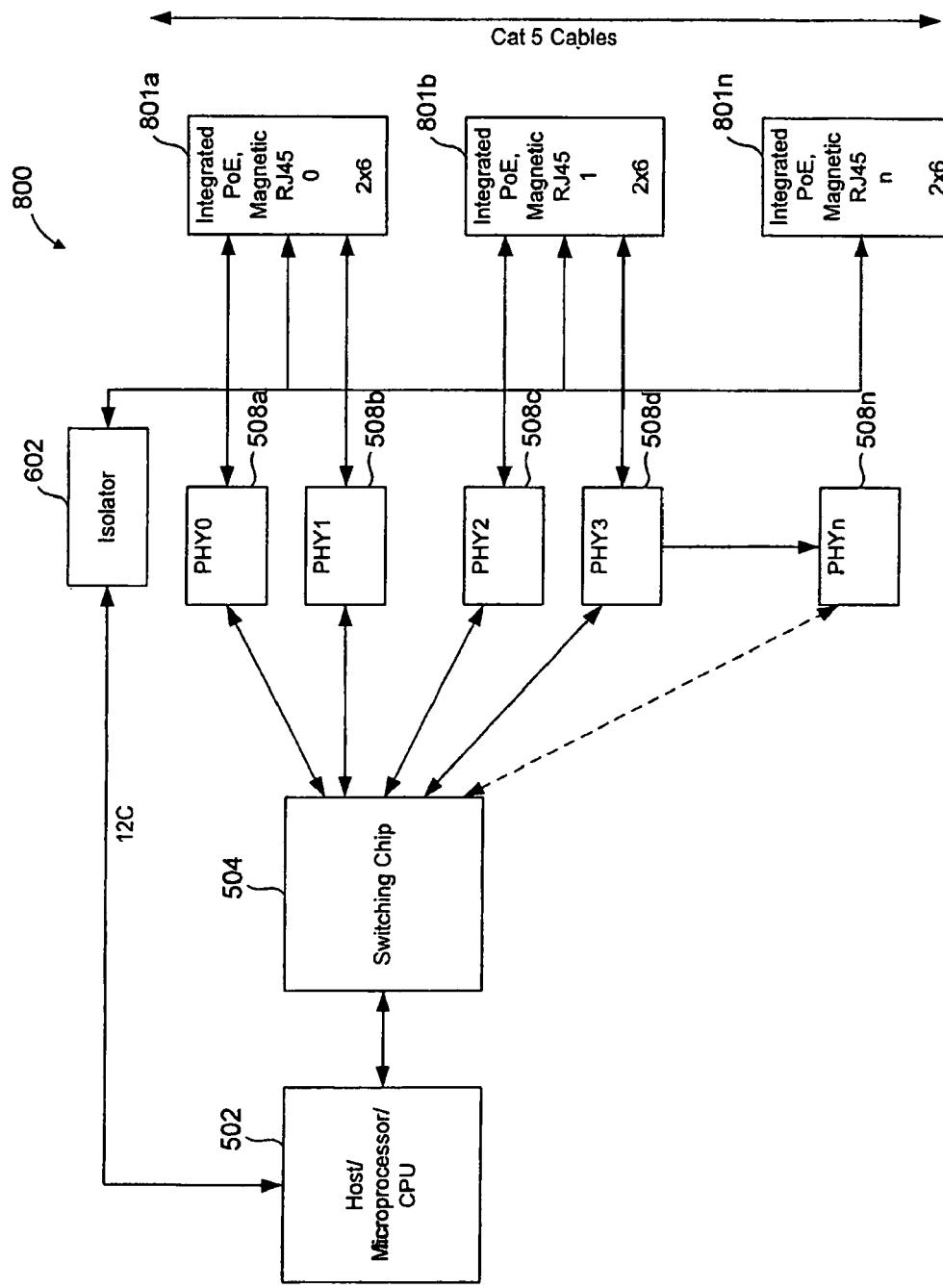

FIG. 8B illustrates the semi-automatic solution 800 with the PHYs 508*a-n* and integrated connectors 801*a-n*, along with the opto-coupler 602, switching chip 504, and host processor/CPU 502 for completeness. As discussed above, the integrated PSE connectors 801*a-n* have corresponding integrated PSE controllers 802*a-n* that operate in a Master/Slave configuration that does not require and external controller.

As illustrated in FIG. 8B, the integrated PSE connector 801*a* with master PSE controller 802*a* controls the slave controllers 802*b-n* for power management of the corresponding PDs. The master PSE 802*a* then reports status to the host processor/CPU 502, thus freeing the host processor/cpu 502 from power management duties.

In embodiments, the PSE Controllers 802 are Broadcom PSE controllers BCM 59101. However the invention is not limited to these PSE Controllers, as other PSE Controllers as will be understood by those skilled in the arts.

In embodiments, the integrated PSE connectors 802 have magnetic jack connectors (RJ-45 or RJ-24) that are configured for 10/100/1000Base-T Ethernet with integrated magnetics that includes PoE functionality and semi-auto mode support, as described above.

In legacy devices (i.e. prior to IEEE 802.3af™ standard was ratified), PD detection is performed using capacitor detection in most of the cases. Specifically, a valid PD included a known capacitor in legacy devices. During detection mode, the PSE sends a known current to the PD device, and the time constant is measured to determine if the proper capacitance was measured. In contrast, non-legacy devices utilize a resistor for this purpose. Specifically, as shown in FIG. 3, signature resistor 248 in the PD provides the detection resistance that is sought during detection mode. Accordingly, legacy devices utilized a capacitor in place of the resistor 248 for PD validation.

Before IEEE802.3af™ standard was ratified, many vendors utilized proprietary methods of detecting a Powered Device (PD) such as IP Phones, Wireless Access Points, etc. Detecting a PD before power can be applied is important due to safety reasons so as to make sure you apply power to a valid device. Many vendors, used a capacitor as a signature on PD side which could be detected to determine if it's a valid device or not. So, it is an important feature for PSE interface to be able to detect legacy devices.

IEEE 802.3af™ defines a resistor signature to be used for detection.

Current integrated PoE magnetic RJ45 solutions do not support legacy detection. However, the present integrated PoE Magnetic RJ45 solution 800 using the integrated PSE controllers 802 does support legacy detection. Specifically, the integrated PSE controllers 802 include the ability to detect legacy capacitors during PD detection, in addition to resistors. Further, an external microcontroller is not necessary for this legacy detection feature.

In embodiments, the PSE controller 404 is a Broadcom BCM 59101 PSE Controller. However, the invention is not limited to this controller. In fact, any PSE controller can be used that has semi-auto power control mode and legacy detection.

Current integrated PoE magnetic RJ45 solutions do not support power management. However, with the support of semi-auto mode, this invention is makes it possible to implement power management with the each integrated PoE magnetic RJ45 solution. In FIG. 8A, a Host CPU may allocate power budget to each integrated PoE magnetic RJ45 module. The master PSE controller in each integrated PoE magnetic RJ45 module will use this power budget to implement power management function.

Figure 9:
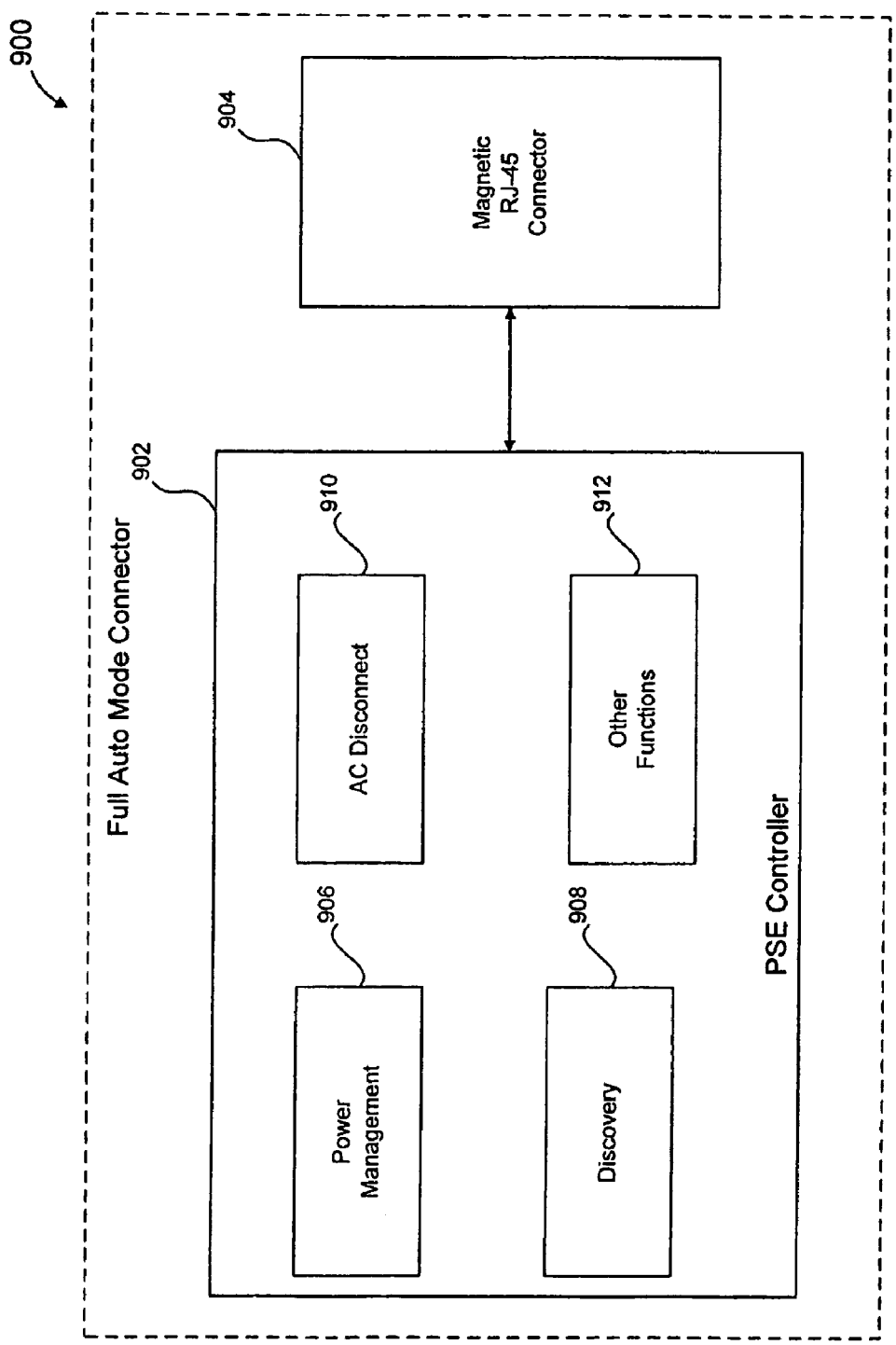
FIG. 9 illustrates a fully-automatic mode or stand-alone solution.

FIG. 9 further illustrates a fully-automatic PSE connector 900. The PSE connector 900 includes a PSE controller 902 and a magnetic RJ-45 connector 904. The invention is not limited to an RJ-45 connector, other types of connectors could be used. The PSE controller 902 includes POE power management 906, discovery/detection mode 908, AC disconnect 910, and other POE functions 912. The PSE controller 902 is capable of operating in fully independent mode and does not require an external communications interface for status reporting, etc. Accordingly, the PSE connector 900 is substantially self-contained, and does not require external communications to conduct POE power management of a corresponding PD device.

As discussed above, high power PD applications are now available that require more than 15.4 Watts, 350 mA per port. Some of the high power PD applications include: IP phones, access points, video cameras, etc. As noted above, class 4 in IEEE 802.3af™ is open for future use. Accordingly, class 4 can be used for the classification of high power configurations that are above and beyond the 15.4 Watts standard that is specified by IEEE 802.3af™. These high power applications can include a POE solution that provides up to 36 watts, according to the present invention. For example, an integrated PSE connector having an integrated PSE controller, described herein, can provide up to 36 Watts of power. In one embodiment, multiple event physical layer classifications and Data Link Layer Classifications could also be used in this high power PD detection.

Figure 10:
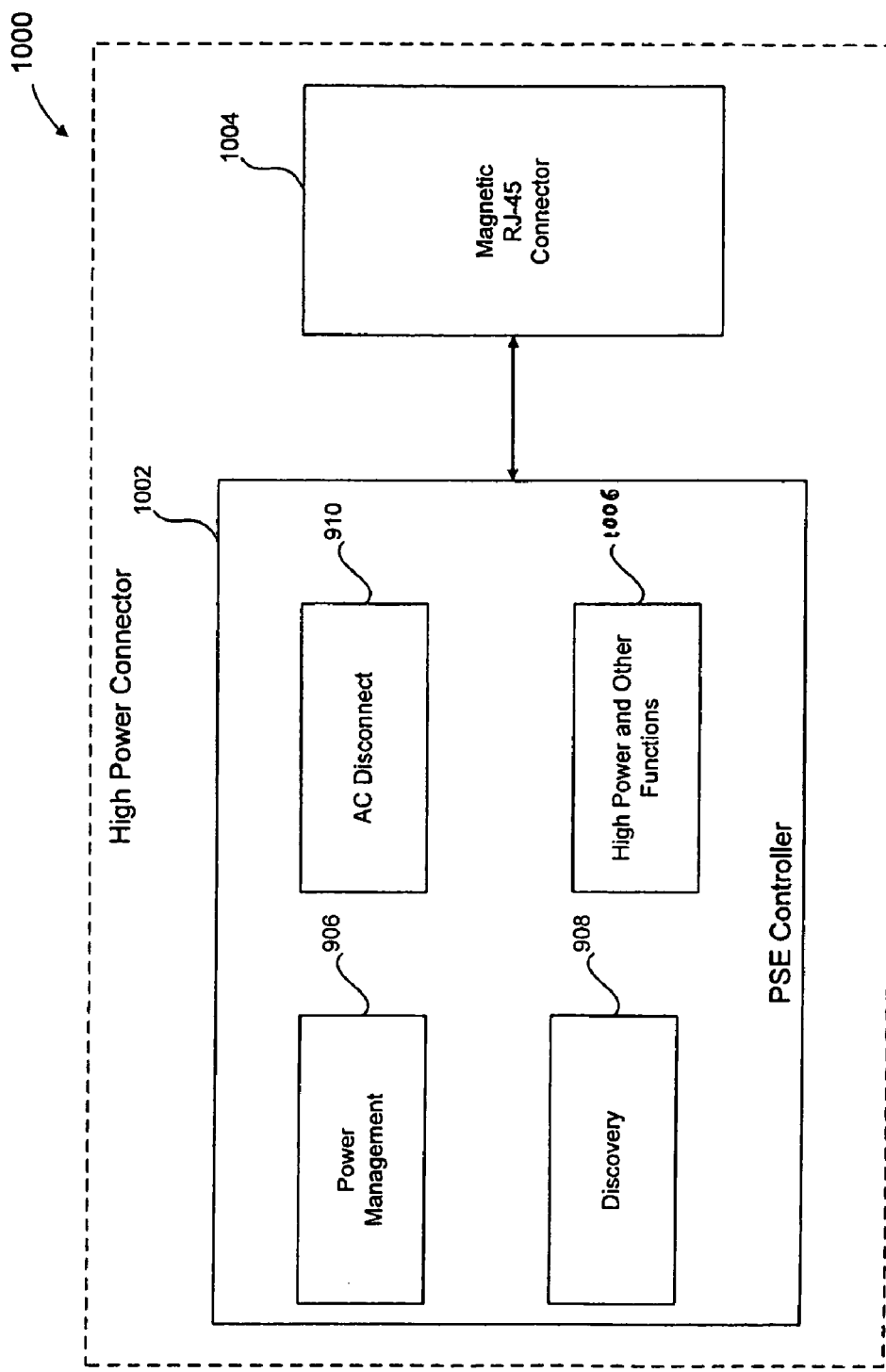
FIG. 10 illustrates a high powered integrated PSE connector 1000, according to embodiments of the present invention.

FIG. 10 illustrates a high powered integrated PSE connector 1000, according to embodiments of the present invention. The high power PSE connector 1000 includes a high power PSE controller 1002, and a magnetic RJ-45 connector 1004. The invention is not limited to an RJ-45 connector, other types of connectors could be used. The PSE connector 1000 is configured to deliver power above, and beyond, that contemplated by the IEEE 802.3af™. More specifically, the PSE connector 1000 is configured to deliver power above 15.4 Watts, 350 mA. For example, the PSE Connector 1000 can deliver up to 36 Watts, at 720 mA, so as to better support high power POE applications. In embodiments, the applied voltage would be approximately 50 volts.

In order to do so, the RJ-45 connector 1004 is configured to support high power, and higher current when compared to the RJ-45 connector 904. For instance, the wire gauge in the magnetics (e.g. 208, 220, 212, 224) may be needed to be increased so as to better handle the higher power and higher current. Further, PSE controller 1002 is configured to source the higher power, greater than that contemplated by IEEE 802.3af™. For example, the PSE Controller 1002 is configured to source up to 720 mA at 50 volts, to deliver up to 36 watts of power.

As noted above, class 4 in IEEE 802.3af™ is open for future use. Accordingly, class 4 can be used for the initiation and classification of high power configurations that are above and beyond the 15.4 Watts standard that is specified by IEEE 802.3af™. These high power applications can include a POE solution that provides up to 36 Watts, according to the present invention. For example, an integrated PSE connector 1000 having an integrated PSE controller 1002, described herein, can provide up to 36 Watts of power under new class 4 operation, via the magnetic jack connector 1004. In other words, class 4 can be used to define and identify the high power operation. In one embodiment, multiple physical layer classifications and data link layer classifications could also be used in this high power PD detection. Integrated controller 1002 includes high power capability 1006 have the ability to source up to 36 Watts of power, at 720 mA to power PD devices.

The invention(s) described herein can be used with all forms of Ethernet communications, including: 10, 100, 1000BASE-T, in addition to 10GBASE-T Ethernet, and other forms of Ethernet and non-Ethernet data communications. It is noted that 10 and 100Base-T uses two pair of the 4 pairs of Ethernet lines for data communications, so that the other two pair can be used for power transfer. Whereas, 1 Gigabit and 10 Gigabit Ethernet uses all four transmission lines for data transmission. The invention is not limited to these standards, and could use other standards.

Further, the invention has been discussed above in relation to IEEE 802.3af™ standard. However the invention is not limited to this standard and can operate within other POE standards and configurations including: IEEE 802.3af™, future IEEE 802.3at™, legacy POE transmission, and other types of POE transmission, all of which are incorporated herein by reference in its entirety.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A power source equipment (PSE) connector, comprising:
a multi-port transmission line connector configured to be connected to multiple Ethernet transmission lines; and
a power source equipment (PSE) controller module integrated with said multi-port transmission line connector, said PSE controller module configured for high power operation beyond that specified by IEEE standard 802.3af™ for powered devices;
wherein magnetics of said multiple port transmission line connector are configured to carry current of at least 720 mA to support said high power operation.

2. The PSE connector of claim 1, wherein said PSE controller module is configured for power operation beyond 15.4 Watts.

3. The PSE connector of claim 1, wherein said PSE controller module utilizes class 4 associated with said IEEE standard 802.3af™ to identify said high power operation.

4. The PSE Connector of claim 1, wherein said PSE controller module utilizes class 4 associated with said IEEE standard 802.3af™ to initialize said high power operation.

5. The PSE Connector of claim 1, wherein said PSE controller module utilizes class 4 of said IEEE standard 802.3af™ to classify said powered devices for said high power operation.

6. The PSE connector of claim 1, wherein said high power operation includes delivering electrical current up to 720 mA.

7. The PSE connector of claim 1, wherein said PSE controller module includes a plurality of high power PSE controllers corresponding to said Ethernet transmission lines, each high power PSE controller configured to deliver power beyond that specified by IEEE 802.3af™ to said powered devices.

8. The PSE connector of claim 1, said PSE controller module including a plurality of high power PSE controllers corresponding to said Ethernet transmission lines, each high power PSE controller configured to deliver approximately 36 Watts of power to said powered devices.

9. The PSE connector of claim 2, wherein said PSE controller module is configured for power operation up to approximately 36 Watts.

10. In a Power over Ethernet (POE) system, a power sourcing equipment (PSE) configured to probe other powered devices (PDs) over a plurality of Ethernet transmission lines, comprising:
a multi-port transmission line connector configured to connect to the multiple Ethernet transmission lines, said multi-port transmission line connector having an integrated transformer for each port of said multi-port transmission line connector;
a power supply configured to provide DC power to said PSE controller to one or more PDs via said integrated transforms of said multi-port transmission line connector; and
a plurality of physical layer devices (PHYs) coupled to said multi-port transmission line connector, and configured to transmit and receive data over said multiple Ethernet transmission lines through said multi-port transmission line connector, said PHYs insulated from said power supply by said integrated transformers;
wherein said multi-port transmission line connector includes a plurality of PSE controllers integrated with said multi-port transmission line connector,
wherein each PSE controller manages said DC power supplied to a corresponding PD, and wherein each said PSE controller is configured to operate for high power operation beyond that specified by IEEE standard 802.3af™ to powered devices, and
wherein magnetics of said multiple port transmission line connector are configured to carry current of at least 720 mA to support said high power operation.

11. The PSE connector of claim 10, wherein each PSE controller is configured for power operation beyond 15.4 Watts.

12. The PSE connector of claim 10, wherein each PSE controller utilizes class 4 associated with said IEEE standard 802.3af™ to identify said high power operation.

13. The PSE Connector of claim 10, wherein each PSE controller utilizes class 4 associated with said IEEE standard 802.3af™ to initialize said high power operation.

14. The PSE Connector of claim 11, wherein each PSE controller utilizes class 4 associated with said IEEE standard 802.3af™ to classify said high power operation.

15. The PSE connector of claim 11, wherein each PSE controller module is configured for power operation up to approximately 36 Watts.

* * * * *

UNITED STATES PATENT AND TRADEMARK OFFICE
CERTIFICATE OF CORRECTION

PATENT NO.        : 8,037,324 B2
APPLICATION NO.   : 12/052458
DATED             : October 11, 2011
INVENTOR(S)       : Asif Hussain It is certified that error appears in the above-identified patent and that said Letters Patent is hereby corrected as shown below:

On the Title page, Item (57), ABSTRACT section, please replace "connector capable connecting" with --connector capable of connecting--.
Column 9, line 65 claim 4, replace "The PSE Connector" with --The PSE connector--.
Column 10, line 1 claim 5, replace "The PSE Connector" with --The PSE connector--.
Column 10, line 57 claim 13, replace "The PSE Connector" with --The PSE connector--.
Column 10, line 60 claim 14, should be replaced with replace "The PSE Connector" with --The PSE connector--.

Signed and Sealed this
First Day of May, 2012

David J. Kappos
*Director of the United States Patent and Trademark Office*